United States Patent
Yamamoto et al.

[11] Patent Number: 6,153,675
[45] Date of Patent: Nov. 28, 2000

[54] FLUORINATED WATER-AND OIL-REPELLENT AGENTS WITH IMPROVED FREEZE-THAW STABILITY

[75] Inventors: Kazuhiro Yamamoto; Yuzuru Ishida, both of Kitaibaraki, Japan

[73] Assignee: Nippon Mektron, Limited, Japan

[21] Appl. No.: 09/133,863

[22] Filed: Aug. 13, 1998

[30] Foreign Application Priority Data

Sep. 12, 1997 [JP] Japan ................................ 9-267811

[51] Int. Cl.⁷ .................... C08L 27/12; C08L 5/02; C08K 5/098; C08F 2/10; C08F 220/22
[52] U.S. Cl. .................... 524/58; 524/56; 524/460; 524/544; 524/732; 524/734; 524/777; 524/805; 526/181; 526/200; 526/210; 526/213; 526/245
[58] Field of Search .................... 524/805, 732, 524/777, 58, 56, 734, 544, 460; 526/245, 200, 210, 181, 203, 213

[56] References Cited

U.S. PATENT DOCUMENTS

| | | | |
|---|---|---|---|
| 3,615,660 | 10/1971 | Bavisotto | 99/50.5 |
| 4,714,727 | 12/1987 | Hume, III | 524/475 |
| 4,742,140 | 5/1988 | Greenwood et al. | |
| 5,242,487 | 9/1993 | Amimoto et al. | 106/2 |
| 5,639,820 | 6/1997 | Kubo et al. | 524/758 |

FOREIGN PATENT DOCUMENTS

| | | |
|---|---|---|
| 59-033380 | 2/1984 | Japan |
| 62-116613 | 5/1987 | Japan |
| 5-017538 | 1/1993 | Japan |
| 5-263070 | 10/1993 | Japan |
| 5-279541 | 10/1993 | Japan |
| 6-017034 | 1/1994 | Japan |
| 7-173772 | 7/1995 | Japan |

OTHER PUBLICATIONS

Database WPI, Week 7531, Derwent Publications Ltd., London, GB, AN 75–51643w XP002097385 & JP 50 049179 A (Asahi Glass Co Ltd), May 1, 1975 *abstract*.

*Primary Examiner*—David W. Wu
*Assistant Examiner*—Kelechi C. Egwim
*Attorney, Agent, or Firm*—Baker & Daniels

[57] ABSTRACT

A water-dispersible, water- and oil-repellent agent, which comprises an aqueous emulsion comprising a copolymer of a fluoroalkyl group-containing monomer with vinylidene chloride or benzyl (meth)acrylate and a carboxyl group-containing, water-soluble polymer, dispersed in water by a nonionic surfactant, preferably the carboxyl group-containing, water-soluble polymer is used together with a sugar alcohol, contains no organic solvent and has a distinguished freeze-thaw stability.

9 Claims, No Drawings

FLUORINATED WATER-AND OIL-REPELLENT AGENTS WITH IMPROVED FREEZE-THAW STABILITY

BACKGROUND OF THE INVENTION

1. Field of the Invention

The present invention relates to a water- and oil-repellent agent and a process for preparing the same, and more particularly to a water- and oil-repellent agent having a distinguished freeze-thaw stability and a process for preparing the same.

2. Description of Related Art

Conventional water- and oil-repellent agents including water-soluble organic solvents such as acetone, ethyl acetate, etc. have a distinguished freeze-thaw stability, but still have such problems as contamination of working circumstances due to use or organic solvents or contamination of effluent water with organic solvents, resulting in an increase in BOD and COD, etc.

"Freeze-thaw stability" is one of test items, which determines such a property of an emulsion of a water- and oil-repellent agent as return to the original state or not when the emulsion is once frozen and then returned to room temperature. Poor freeze-thaw stability indicates occurrence of such phenomena as precipitation, increased viscosity or sometimes solidification during the transport in cold districts. Once denaturing of the emulsion occurs due to such phenomena, the commercial value of the water- and oil-repellent agent will be entirely lost.

The following water- and oil-repellent agents including water-soluble organic solvents have been so far proposed.

JP-A-7-173772 discloses a water-emulsifiable, fluorine-based water- and oil-repellent agent which comprises 100 parts by weight of polyfluoroalkyl group-containing polymer and 1 to 20 parts by weight of glycol. In the conventional emulsion polymerization to form water-dispersible, water- and oil-repellent polymers, at least 50 parts by weight of a low boiling organic solvent such as acetone, ethyl acetate, etc. is used per 100 parts by weight of a monomer mixture to improve the compatibility of polyfluoroalkyl group-containing monomers with an aqueous medium or with other comonomers, where the residual organic solvent, if any, lowers the color fastness. By using a smaller amount of glycol, the disadvantage can be improved, by the glycol as an organic solvent still remains in the resulting water- and oil-repellent aqueous emulsion.

JP-A-5-263070 discloses that emulsion polymerization of fluoroalkyl group-containing monomers is carried out in an aqueous solution containing a specific glycol ether or glycol ester. It is discloses that the proportion of these glycols to be used can be reduced to about 10 to about 30 parts by weight per 100 parts by weight of the monomer mixture in contrast to a proportion of the ordinary organic solvent of about 60 to about 100 part by weight, but the glycols as an organic solvent also still remains in the resulting water- and oil-repellent aqueous emulsion.

JP-A-6-17034 discloses a water- and oil-repellent aqueous latex where polyfluoroalkyl group-containing polymers are dispersed in an aqueous medium containing a glycol ether-typed solvent. It is disclosed that a proportion of the glycol ether-typed solvent to be used is about 50 to about 5% by weight on the basis of total weight of the emulsion including water, and thus a considerably large amount of the organic solvent is used.

JP-A-5-279541 discloses that various organic solvents such as acetone, etc. are present in the emulsion polymerization to form fluorine-containing copolymers, which it is stated that a considerable portion of the solvent can be made to remain in the resulting aqueous dispersion, but a complicated, expensive procedure for removing the solvent at 40° to 90° C. in vacuum is used from the viewpoints of safety and industrial sanitation.

JP-A-5-17538 discloses formation of an aqueous emulsion by once emulsifying and dispersing perfluoroalkyl acrylate, carboxyl group-containing α, β-ethylenic unsaturated monomer and hydroxy group-containing α,β-ethylenic unsaturated monomer into water to form particles having particles sizes of not more than 0.3 μm, followed by polymerization. Though the disclosed procedure uses no organic solvent, not only a complicated means of conducting ultrasonic irradiation for 60 minutes while bubbling the emulsion having an average particle size of about 1 μm with a nitrogen gas is used to make the particle size not more than 0.3 μm, but also there is a possibility of precipitation when only a small amount of cationic component is mixed therein during the water- and oil-repellent processing such as dipping, etc. because the resulting copolymers partially contain carboxyl groups.

SUMMARY OF THE INVENTION

An object of the present invention is to provide a water-emulsion water- and oil-repellent agent entirely free of an organic solvent and having a distinguished freeze-thaw stability.

The object of the present invention can be attained by a water- and oil-repellent agent, which comprises an aqueous emulsion comprising a copolymer of fluoroalkyl group-containing monomer with vinylidene chloride or benzyl (meth)acrylate and a carboxyl group-containing, water-soluble polymer, dispersed in water by a nonionic surfactant, where it is preferable to use a sugar alcohol together with the carboxyl group-containing, water-soluble polymers.

DETAILED DESCRIPTION OF THE INVENTION

The present water- and oil-repellent agent can be prepared by a method for emulsion polymerization of fluoroalkyl group-containing monomers with vinylidene chloride or benzyl (meth)acrylate;

(1) in the presence of a nonionic surfactant, followed by adding a carboxyl group-containing, water-soluble polymer, or (2) in the presence of a nonionic surfactant and a carboxyl group-containing, water-soluble polymer, where it is preferable to use a sugar alcohol together with the carboxyl group-containing, water-soluble polymer.

The fluoroalkyl group-containing monomer for use in the present invention can be represented by the following general formula:

where R is a hydrogen atom or a methyl group, $R_1$ is a divalent organic group and Rf is a perfluoroalkyl group having 4 to 20 carbon atoms and includes, for example, the following monomer compounds.

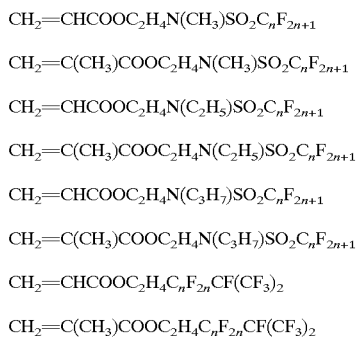

Among the monomer compounds given above, compounds with $R_1=C_2H_4$ are preferably used. Generally, mixtures of linear perfluoroalkyl groups with various n values can be used from the viewpoints of performance and cost.

As comonomers to be copolymerized with the perfluoroalkyl group-containing monomers, vinylidene chloride or benzyl (meth)acrylate is selected from viewpoints of both water and oil repellency and freeze-thaw stability. To satisfy these two requirements, about 30 to about 90% by weight, preferably about 45 to about 85% by weight, of the perfluoroalkyl group-containing monomer and about 70 to about 10% by weight, preferably about 55 to about 15% by weight, of vinylidene chloride or benzyl (meth)acrylate are copolymerized, sum total being 100% by weight.

The fluoroalkyl group-containing copolymer comprising these essential components can be further copolymerized with not more than 10% by weight, preferably about 0.5 to about 7% by weight on the basis of the total copolymer, of a hydroxyl group-containing monomer such as hydroxyethyl (meth)acrylate, hydroxypropyl (meth)acrylate, 3-chloro-2-hydroxypropyl methacrylate, glycerine monomethacrylate, alkyleneglycol mono(meth)acrylate, etc. These hydroxyl group-containing monomers can improve the adhesion of the water- and oil-repellent agent or improve the durability of the water- and oil-repellent agent by using a cross-linking agent reactive with the hydroxyl group.

The copolymer can be further copolymerized with not more than about 10% by weight, preferably about 0.5 to about 7% by weight on the basis of the total copolymer, of a cross-linkable group-containing monomer such as N-methylol (meth)acrylamide, N-methoxymethyl acrylamide, N-butoxymethyl acrylamide, acrylamide, glycidyl (meth)acrylate, etc. These cross-linkable group-containing monomers can improve the durability of the water- and oil-repellent agent by cross-linking with hydroxyl groups on fiber surfaces or self cross-linking.

Copolymerization reaction is carried out by emulsion polymerization using a radical initiator in the presence of a nonionic surfactant. Preferable nonionic surfactant for use in the present invention includes, for example, polyoxyethylene ether derivatives such as polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, etc., where about 1 to about 10% by weight, preferably about 2 to about 6% by weight, of the nonionic surfactant can be used on the basis of the total monomers. Below about 1% by weight, precipitation takes place during the polymerization, whereas above about 10% by weight the carboxyl group-containing, water-soluble polymer fails to absorb onto the emulsion particles. Thus, proportion of the nonionic surfactant is desirably as small as possible.

Radial initiator for use in the present invention includes, for example, an organic peroxide, an azo compound, a persulfate, etc. Preferable are potassium persulfate, ammonium persulfate, 2,2'-azobis(2-aminodipropane) .dihydrochloride, etc.

The copolymerization reaction can be carried out in an aqueous medium at a temperature of about 40° to about 80° C. for about 1 to about 10 hours to form an aqueous emulsion having a solid concentration of about 15 to about 35% by weight. The resulting aqueous emulsion is admixed with a sugar alcohol or a carboxyl group-containing, water-soluble polymer or preferably with both.

Generally, water starts to freeze and growth of ice crystals starts, with decreasing temperature of the aqueous emulsion. Once the grow the of ice crystals starts, emulsion particles themselves will approach to one another to start mutual fixing. If there is a protective layer on the particle surfaces, no mutual fixing takes place by virtue of the strong protective layer even when the particles are subject to pressure exerted by ice crystals. However, if there is no effective protective layer on the particle surfaces, mutual fixing of the particles takes place and remains as it is even when the aqueous emulsion is returned to room temperature, resulting in increased viscosity, precipitate formation, entire solidification, etc. An emulsifying agent used at the polymerization reaction can serve to form a protective layer, which is, however, not strong enough to withstand the pressure exerted by ice crystal. On the other hand, the carboxyl group-containing, water-soluble polymer can be effectively adsorbed onto the emulsion particles to form an effective protective layer for withstanding the pressure exerted by ice crystals.

Proportion of the carboxyl group-containing, water-soluble polymer to be added is considerably small, i.e. about 0.1 to about 2% by weight, preferably about 0.2 to about 1% by weight on the basis of total amount of monomer mixture or fluoroalkyl group-containing copolymer. The carboxyl group-containing, water-soluble polymer includes, for example, sodium salts of polyacrylic acid, polyitaconic acid, methyl acrylate-acrylic acid copolymer, acrylic acid-methacrylic acid copolymer, etc., sodium salts of acrylic acid-maleic acid copolymer, acrylic acid-styrene sulfonic acid copolymer, etc., and the following carboxyl group-containing, water-soluble polymers having a low average molecular weight range (about 1000~about 15000) can be used. When those having a higher average molecular weight are used, the resulting water- and oil-repellent agent has too high a viscosity and will be unstable.

In practice, the following commercially available products are used. For sodium polyacrylate or polyacrylic acid (for Na salt formation), water-soluble polymers such as Aron A series (products commercially available from Toagosei Co., Ltd. Japan), e.g. A-200U (average molecular weight: 2,000), A-20U (average molecular weight: 6,000), A-20UK (average molecular weight: 6,000), A-20UN (avearge molecular weight: 8,000), A-40HA (average molecular weight: 12,000), etc.; Aquaric series (products commercially available from Nippon Shokubai Kogyo K. K., Japan), e.g. DL-324 (average molecular weight: 2,000), DL-40S (average molecular weight: 5,000), DL-100 (average molecular weight: 5,000), DL-384 (average molecular weight: 8,000), HL-415 (average molecular weight: 10,000), etc.; Julymer series (products commercially available from Nippon Junyaku K. K., Japan), e.g. AC-103 (average molecular weight: 6,000), AC-107 (average molecular weight: 3,000), etc. each can be used. For methyl acrylate-sodium acrylate copolymer, Julymer AC-103A (average molecular weight: 6,000), etc. can be used. For sodium acrylate-sodium methacrylate copolymer, Julymer AC-203 (average molecular weight: 6,000), etc. can be used. For sodium polyitaconate, Julymer AC-70N (average molecular weight: 10,000), etc. can be used. For sodium salts of acrylic acid-maleic acid copolymer, Aquaric TL-37, etc. can be used.

A portion of surfactants used at the polymerization to protect the emulsion particles can be replaced with the carboxyl group-containing, water-soluble polymer, which can be strongly bonded to the emulsion particles. That is, it seems that the emulsion particles protected by the carboxyl group-containing, water-soluble polymer can be more stabilized against freezing than those protected by the surfactant. When a sugar alcohol is used together, it seems that the carboxyl group-containing, water-soluble polymer strongly bonded around the emulsion particles can be further protected by the surfactant used at the polymerization and the sugar alcohol.

The carboxylic group-containing, water-soluble polymer or further the sugar alcohol can be added to the aqueous emulsion obtained by the emulsion polymerization. Furthermore, the carboxylic group-containing, water-soluble polymer or the sugar alcohol can be added to the emulsion polymerization system together with the nonionic surfactant and subjected to the emulsion polymerization, where it is preferable to used the carboxyl group-containing, water-soluble polymer and the sugar alcohol at the same time.

Sugar alcohol (polyhydric alcohol obtained by reducing the carbonyl groups of sugar) for use in the present invention includes, for example, erythritol, xylitol, ribitol, arabitol, galactitol, sorbitol, ididitol, mannitol, parantinit, maltitol, lactitol, maltotritol, isomaltotritol, maltotetraitol, isomaltotetraitol, reducing malt sugar, etc. From the viewpoint of availability, maltitol, paratinit, lactitol, erythritol, xylitol, mannitol, sorbitol, etc. can be preferably used. Together with the carboxyl group-containing, water-soluble polymer, these sugar alcohols can be used in a proportion of about 2 to about 20% by weight, preferably about 2 to about 10% by weight, on the basis of total monomer mixture or fluoroalkyl group-containing copolymer.

On the other hand, glucose and sucrose have a weak protective effect on the emulsion particles like sugar alcohols, but have such a disadvantage coloration due to insufficient heat stability with used as a water- and oil-repellent agent, for example, when applied to nylon cloth, followed by heat treatment.

By adding a sugar alcohol or a carboxyl group-containing, water-soluble polymer, preferably both together, to a water- and oil-repellent agent, which comprises an aqueous emulsion comprising a copolymer of fluoroalkyl group-containing monomer and vinylidene chloride or benzyl (meth)acrylate dispersed in water by a nonionic surfactant, a water- and oil-repellent agent having a distinguished freeze-thaw stability can be obtained without using an organic solvent. Any special precaution is no more required for storage in winter or transportation, etc. for such a water- and oil-repellent agent.

PREFERRED EMBODIMENTS OF THE INVENTION

The present invention will be described in detail below, referring to Examples.

POLYMERIZATION EXAMPLE 1

Into a glass separable flask having a capacity of 2,000 ml with a stirrer were charged 250 g of a mixture of compounds having the following general formula:

$CH_2=CHCOOC_2H_4C_nF_{2n+1}$ (where n is 6 to 14 and 9.0 on average), 150 g of benzyl methacrylate, 25 g of 2-hydroxyethyl acrylate and 1,368 ml of deionized water together with 10 g of a nonioric surfactant Emulgen 930 (polyoxyethylene nonyl phenyl ether; HLB=15.1, a product commercially available from Kao Corp., Japan) and 10 g of a noionic surfactant Emulgen 950 (polyoxyethylene nonyl phenyl ether; HLB=18.2, a product commercially available from the same company as above). The charged mixture was subjected to emulsification treatment under pressure of 600 kg/cm², using a high pressure homogenizer (made by Nippon Seiki K. K., Japan) and then subjected to stirring for 30 minutes while injecting a nitrogen gas therein.

After the inside pressure of the reactor vessel was gradually elevated to 40° C., 50 g of vinylidene chloride and 25 g of N-methylol acrylamide dissolved in 50 ml of deionized water were added thereto, and furthermore 12 g of 2,2'-azobis (2-amidinopropane).dihydrochloride dissolved in 50 ml of deionized water was added thereto to start polymerization reaction.

The reaction was carried out at 70° C. for 4 hours while gradually increasing the inside temperature to 70° C., and then the reaction mixture was cooled, whereby 1,950 g of an aqueous emulsion having a solid concentration of 25.8% by weight was obtained. Polymerization yield calculated from the recovered product weight was 94.6%.

POLYMERIZATION EXAMPLE 2

In polymerization Example 1, the amount of benzyl methacrylate was changed to 50 g, and that of vinylidene chloride to 150 g.

POLYMERIZATION EXAMPLE 3

In polymerization Example 1, 53.2 g of sorbitol was charged at the same time when the monomers were charged, to conduct polymerization reaction in the presence of sorbitol, whereby 2,002.3 g of an aqueous emulsion having a solid concentration of 27.6% by weight was obtained. The amount of the charged sorbitol is corresponded to 10% by weight of the solid content of the water- and oil-repellent agent.

POLYMERIZATION EXAMPLE 4

In Polymerization Example 3, sorbitol was charged in an amount corresponding to 20% by weight of the solid content of the water- and oil-repellent agent to conduct polymerization reaction.

POLYMERIZATION EXAMPLE 5

In Polymerization Example 3, sodium polyacrylate (A-20U) was charged in an amount corresponding to 0.5% by weight of the solid content of the water- and oil-repellent agent in place of sorbitol to conduct polymerization reaction.

POLYMERIZATION EXAMPLE 6

In Polymerization Example 3, the amount of sorbitol was changed to that corresponding to 5% by weight of the solid content of the water- and oil-repellent agent, and the amount of sodium polyacrylate (A-20U) to that corresponding to 0.5% by weight of the solid content of the water- and oil-repellent agent to conduct polymerization reaction.

POLYMERIZATION EXAMPLE 7

In Polymerization Example 1, the amount of benzyl methacrylate was changed to 200 g and the polymerization reaction was carried out without using vinylidene chloride.

POLYMERIZATION EXAMPLE 8

In Polymerization Example 1, the amount of vinylidene chloride was changed to 200 g, and the polymerization reaction was carried but without using benzyl methacrylate.

POLYMERIZATION EXAMPLE 9

In Polymerization Example 1, 150 g of methyl methacrylate and 50 g of ethyl methacrylate were charged and the polymerization reaction was carried out without using benzyl methacrylate and vinylidene chloride.

EXAMPLES 1 TO 15

The aqueous emulsion of Polymerization Example 1 was admixed with sorbitol and/or various commercially available carboxyl group-containing, water-soluble polymers (which will be hereinafter referred to as "commercially available resins") in specific amounts (which will be hereinafter referred to as "addition proportions") to the solid content of the aqueous emulsion (fluoroalkyl group-containing copolymer). The water- and oil-repellent agent emulsions thus prepared were applied to three kinds of cloth, i.e. cotton broad cloth, nylon taffeta and polyester amunzen to conduct water- and oil-repellent treatment. Their water- and oil-repellent properties and freeze-thaw stability were evaluated.

(Treatment procedure)

The three kinds of cloth were dipped in treatment baths and then squeezed up to the desired pickup by a mangle and then dried and cured under conditions given in the following Table.

|  | Cotton | Nylon | Polyester |
|---|---|---|---|
| Solid concentration of Treating solution (%) | 0.5 | 0.5 | 0.25 |
| Pickup (%) | 100 | 40 | 60 |
| Drying | 80° C. for 10 min. | 80° C. for 10 min. | 80° C. for 10 min. |
| Curing | 150° C. for 3 min. | 170° C. for 1.5 min. | 150° C. for 3 min. |

(Water-repellent property)

Designated by number according to JIS L-1092 spray test, where the number ranges from 0 to 100; the larger number shows better water repellency.

(Oil-repellent property)

Designated by number according to AATCC TM-118, where the number ranges from 0 to 8; the larger number shows better oil repellency.

(freeze-thaw stability)

Water- and oil-repellent agent emulsions were kept in a refrigerator at −25° C. for 16 hours and then kept at room temperature for 8 hours. At that time the sample state was visually inspected, and freezing and melting were repeated until such changes as precipitation, solidification, etc. were observed. The number of runs until a sample could be kept from such changes was assessed as a stability.

The results are shown in the following Table 1:

TABLE 1

| Ex. No. | Sorbitol Addition Proportion (%) | Commercial available resin Trade mark | Commercial available resin Proportion (%) | Freeze-thaw Water/oil repellency Cotton | Freeze-thaw Water/oil repellency Nylon | Freeze-thaw Water/oil repellency Polyester | Stability (run number) |
|---|---|---|---|---|---|---|---|
| 1 | — | A-20U | 0.3 | 100/5 | 100/5 | 100/5 | 1 |
| 2 | — | A-20U | 0.5 | 100/5 | 100/5 | 100/5 | 4 |
| 3 | — | A-20U | 1.0 | 70/5 | 100/5 | 100/5 | 4 |
| 4 | — | A-20U | 2.0 | 70/5 | 100/5 | 100/5 | 4 |
| 5 | 5 | A-20U | 0.3 | 100/5 | 100/5 | 100/5 | 5 |
| 6 | 10 | A-20U | 0.3 | 100/5 | 100/5 | 100/5 | 7 |
| 7 | 5 | A-20U | 0.5 | 100/5 | 100/5 | 100/5 | 5 |
| 8 | 10 | A-20U | 0.5 | 100/5 | 100/5 | 100/5 | 7 |
| 9 | 10 | A-200U | 0.5 | 100/5 | 100/5 | 100/5 | 6 |
| 10 | 10 | AC-70N | 0.5 | 100/5 | 100/5 | 100/5 | 7 |
| 11 | 10 | AC-103 | 0.5 | 100/5 | 100/5 | 100/5 | 7 |
| 12 | 10 | DL-40S | 0.5 | 100/5 | 100/5 | 100/5 | 5 |
| 13 | 10 | AC-203 | 0.5 | 100/5 | 100/5 | 100/5 | 7 |
| 14 | 10 | TL-37 | 0.5 | 100/5 | 100/5 | 100/5 | 5 |
| 15 | 10 | AC-103A | 0.5 | 100/5 | 100/5 | 100/5 | 7 |

EXAMPLES 16 TO 25

The aqueous emulsion of Polymerization Example 1 was admixed with specific amounts of various sugar alcohols and 0.5% of commercially available resin (A-20U) to prepare water- and oil-repellent agent emulsions. The thus obtained emulsions were tested for the water repellency, the oil repellency and the freeze-thaw stability in the same manner as in Examples 1 to 15.

The results are shown in the following Table 2.

TABLE 2

| Ex. No. | Sugar alcohol Compound | Proportion (%) | Water/oil repellency Cotton | Nylon | Polyester | Freeze-thaw stability (run numbers) |
|---|---|---|---|---|---|---|
| 16 | Xylitol | 5 | 100/5 | 100/5 | 100/5 | 5 |
| 17 | Xylitol | 10 | 100/5 | 100/5 | 100/5 | 7 |
| 18 | Lactitol | 5 | 100/5 | 100/5 | 100/5 | 5 |
| 19 | Lactitol | 10 | 100/5 | 100/5 | 100/5 | 6 |
| 20 | Paratinit | 5 | 100/5 | 100/5 | 100/5 | 5 |
| 21 | Paratinit | 10 | 100/5 | 100/5 | 100/5 | 6 |
| 22 | Erythritol | 5 | 100/5 | 100/5 | 100/5 | 5 |
| 23 | Erythritol | 10 | 100/5 | 100/5 | 100/5 | 7 |
| 24 | Mannitol | 5 | 100/5 | 100/5 | 100/5 | 5 |
| 25 | Mannitol | 10 | 100/5 | 100/5 | 100/5 | 6 |

EXAMPLES 26 TO 31

The aqueous emulsion of Polymerization Example 2 was admixed with 10% of various sugar alcohols and 0.5% of commercially available resin (A-20U) to prepare water- and oil-repellent emulsions. The thus obtained emulsions were tested for the water repellency, the oil repellency and the freeze-thaw stability in the same manner as in Examples 1 to 15.

The results are shown in the following Table 3:

TABLE 3

| Ex. No. | Sugar alcohol | Water/oil repellency Cotton | Nylon | Polyester | Freeze-thaw Stability (run number) |
|---|---|---|---|---|---|
| 26 | Sorbitol | 100/5 | 100/5 | 100/5 | 6 |
| 27 | Xylitol | 100/5 | 100/5 | 100/5 | 7 |
| 28 | Lactitol | 100/5 | 100/5 | 100/5 | 7 |
| 29 | Paratinit | 100/5 | 100/5 | 100/5 | 6 |
| 30 | Erythritol | 100/5 | 100/5 | 100/5 | 5 |
| 31 | Mannitol | 100/5 | 100/5 | 100/5 | 6 |

EXAMPLE 32

The aqueous emulsion of Polymerization Example 3 containing sorbitol in an amount corresponding to 10% by weight in advance was admixed with 0.5% by weight of sodium polyacrylate (A-20U) to prepare a water- and oil-repellent agent emulsion. The thus obtained emulsion was tested for the water repellency, the oil repellency and the freeze-thaw stability in the same manner as in Examples 1 to 15.

EXAMPLE 33

The aqueous emulsion of Polymerization Example 5 containing sodium polyacrylate (A-20U) in an amount corresponding to 0.5% by weight in advance was admixed with 5% by weight of sorbitol to prepare a water- and oil-repellent emulsion. The thus obtained emulsion was tested for the water repellency, the oil repellency and the freeze-thaw stability in the same manner as in Examples 1 to 15.

EXAMPLE 34

The aqueous emulsion of Polymerization Example 6 was tested for the water repellency, the oil repellency and the freeze-thaw stability in the same manner as in Examples 1 to 15.

EXAMPLE 35

In Example 7, the aqueous emulsion of Polymerization Example 7 was used in place of the aqueous emulsion of Polymerization Example 1.

EXAMPLE 36

In Example 7, the aqueous emulsion of Polymerization Example 8 was used in place of the aqueous emulsion of Polymerization Example 1.

Test results of Examples 32 to 36 are shown in the following Table 4:

TABLE 4

| Ex. No. | Water/oil repellency Cotton | Nylon | Polyester | Freeze-thaw Stability (run number) |
|---|---|---|---|---|
| 32 | 100/5 | 100/5 | 100/5 | 7 |
| 33 | 100/5 | 100/5 | 100/5 | 5 |
| 34 | 100/5 | 100/5 | 100/5 | 6 |
| 35 | 100/5 | 100/5 | 100/5 | 5 |
| 36 | 100/5 | 100/5 | 100/5 | 5 |

COMPARATIVE EXAMPLES 1 TO 6

The aqueous emulsions obtained in Polymerization Examples 1 to 4 and Polymerization Examples 7 to 8, respectively (Polymerization Examples 3 and 4 contain sorbitol in amounts corresponding to 10% by weight and 20% by weight, respectively) were tested for the water repellency, the oil repellency and the freeze-thaw stability in the same manner as in Examples 1 to 15. Only the following results were obtained:

| Water/oil repellency: | |
|---|---|
| Cotton | 100/4 |
| Nylon | 100/5 |
| Polyester | 100/5 |
| Freeze-thaw stability | 0 (1 only for Polymerization Example 4) |

COMPARATIVE EXAMPLES 7 TO 11

The aqueous emulsion of Polymerization Example 9 was admixed with specific amounts (addition proportions) to the solid content of the aqueous emulsion of sorbitol and/or sodium polyacrylate (A-20U) to prepare water- and oil-repellent emulsions. The thus obtained emulsions were tested for the water repellency, the oil repellency and the freeze-thaw stability in the same manner as in Examples 1 to 15.

The results are shown in the following Table 5:

TABLE 5

| Comp. Ex. No. | Sorbitol Addition Proportion (%) | A-20U Addition Proportion (%) | Water/oil repellency | | | Freeze-thaw stability (run numbers) |
| --- | --- | --- | --- | --- | --- | --- |
| | | | Cotton | Nylon | Polyester | |
| 7 | — | — | 90/3 | 100/4 | 100/4 | 0 |
| 8 | 20 | — | 90/3 | 100/4 | 100/4 | 0 |
| 9 | 30 | — | 90/3 | 100/4 | 100/4 | 0 |
| 10 | 5 | 0.5 | 90/3 | 100/4 | 100/4 | 1 |
| 11 | 10 | 0.3 | 90/3 | 100/4 | 100/4 | 1 |

COMPARATIVE EXAMPLES 12 TO 22

The aqueous emulsion of Polymerization Example 1 was admixed with specific amounts (addition proportion) to the solid content of the aqueous emulsion of sorbitol and/or polyvinyl alcohol (Denkapoval, trademark of products commercially available from Denki Kagaku Kogyo K. K., Japan) to prepare water- and oil-repellent emulsions. The thus obtained emulsions were tested for the water repellency, the oil repellency and the freeze-thaw stability in the same manner as in Examples 1 to 15. The results are shown in the following Table 6:

TABLE 6

| Comp. Ex. No. | Sorbitol Addition Proportion (%) | PVA | | Water/oil repellency | | | Freeze-thaw stability (run number) |
| --- | --- | --- | --- | --- | --- | --- | --- |
| | | Type No. | Proportion (%) | Cotton | Nylon | Polyester | |
| 12 | 10 | — | — | 100/4 | 100/5 | 100/5 | 0 |
| 13 | 20 | — | — | 100/4 | 100/5 | 100/5 | 1 |
| 14 | 30 | — | — | 100/4 | 100/5 | 100/5 | 3 |
| 15 | — | K-17c | 2.0 | 100/4 | 100/5 | 100/5 | 0 |
| 16 | — | B-17 | 2.0 | 100/4 | 100/5 | 100/5 | 0 |
| 17 | — | K-05 | 2.0 | 100/4 | 100/5 | 100/5 | 0 |
| 18 | — | B-05 | 2.0 | 100/4 | 100/5 | 100/5 | 0 |
| 19 | 10 | K-17c | 0.5 | 100/4 | 100/5 | 100/5 | 0 |
| 20 | 10 | B-17 | 0.5 | 100/4 | 100/5 | 100/5 | 0 |
| 21 | 10 | K-05 | 0.5 | 100/4 | 100/5 | 100/5 | 0 |
| 22 | 10 | B-05 | 0.5 | 100/4 | 100/5 | 100/5 | 0 |

Note)
K-17c: Saponification degree 99%, Polymerization degree 1700
B-17: Saponification degree 88%, Polymerization degree 1700
K-05: Saponification degree 98.5%, Polymerization degree 600
B-05: Saponification degree 88%, Polymerization degree 600

What is claimed is:

1. A water- and oil-repellant agent, which comprises an aqueous emulsion comprising a copolymer of a fluoroalkyl group-containing monomer with vinylidene chloride or benzyl (meth)acrylate, a sodium salt of a carboxyl group-containing, water-soluble polymer, and a sugar alcohol, dispersed in water by a nonionic surfactant.

2. A water- and oil-repellent agent according to claim 1, wherein the fluoroalkyl group-containing monomer is represented by the following formula:

$$CH_2\!=\!CRCOOR_1Rf$$

where R is a hydrogen atom or a methyl group, $R_1$ is a divalent organic group and Rf is a perfluoroalkyl group having 4 to 20 carbon atoms.

3. A water- and oil-repellent agent according to claim 1, wherein the fluoroalkyl group-containing copolymer is additionally copolymerized with a hydroxyl group-containing monomer.

4. A water- and oil-repellent agent according to claim 1, wherein the carboxy group-containing, water-soluble polymer is a polymer having an average molecular weight range of 1000 to 15000.

5. A water- and oil-repellent agent according to claim 1, wherein the carboxyl group-containing, water-soluble polymer is present in a proportion of 0.1 to 2% by weight, based on the weight of the fluoroalkyl group-containing copolymer.

6. A water- and oil-repellant agent according to claim 1, wherein the sugar alcohol is a polyhydric alcohol obtained by reducing carbonyl groups of sugar.

7. A water- and oil-repellant agent according to claim 1, wherein the sugar alcohol is present in a proportion of 2 to 20% by weight, based on the weight of the fluoroalkyl group-containing copolymer.

8. A process for preparing a water- and oil-repellant agent, which comprises subjecting a fluoroalkyl group-containing monomer and vinylidene chloride or benzyl(meth)acrylate to emulsion polymerization in the presence of a nonionic surfactant and adding a sodium salt of a carboxyl group-containing, water-soluble polymer and a sugar alcohol to the resulting aqueous emulsion.

9. A process for preparing a water- and oil-repellant agent, which comprises subjecting a fluoroalkyl group-containing monomer and vinylidene chloride or benzyl(meth)acrylate to emulsion polymerization, in the presence of a nonionic surfactant sodium salt of a carboxyl group-containing, water-soluble polymer and a sugar alcohol.

* * * * *